United States Patent [19]

Kennedy

[11] 4,091,713
[45] May 30, 1978

[54] RADIUS MILLING OR GRINDING TOOL ACTUATOR OR CONTROLLER

[76] Inventor: Henry J. Kennedy, 2029 Frederick St., Beloit, Wis. 53511

[21] Appl. No.: 751,271

[22] Filed: Dec. 17, 1976

[51] Int. Cl.² .................... B23C 3/00; B24B 7/00
[52] U.S. Cl. .................... 90/15 A; 33/27 R; 51/90; 74/86; 74/600
[58] Field of Search ........... 90/15 R, 15 A, 11 R; 74/600, 86; 33/27 R, 27 L, 27 G; 51/90; 82/12

[56] References Cited

U.S. PATENT DOCUMENTS 3,026,752  3/1962  Zabel .................... 82/12
3,526,060  9/1970  Hall et al. .................... 51/90

Primary Examiner—Gil Weidenfeld
Attorney, Agent, or Firm—Dirk J. Veneman

[57] ABSTRACT

A tool controlling apparatus for rotating a tool through a circular path of adjustable radius wherein a first plate member is caused to move in a first direction and second plate member is caused to move with said first plate member and in a direction perpendicular to the direction of movement of said first plate member thereof causing any point on said second plate member to travel in a circular path. A cutting tool is attached to said second plate member.

3 Claims, 3 Drawing Figures

RADIUS MILLING OR GRINDING TOOL ACTUATOR OR CONTROLLER

BACKGROUND OF THE INVENTION

This invention relates to the art of machine tools and more particularly to a novel toolholder for forming a curved internal or external cut of preselected radius.

More particularly, the invention relates to a machine toolholder comprising two platforms movable with respect to each other at right angles to produce a circular motion and including means for mounting a powered cutting tool on one of said platforms whereby said cutting tool is moved along a circular path.

Cutting toolholders which produce a circular motion are known in the prior art, but these holders are designed for holding a stationary cutting tool and, therefore, the cutting force imposed on the tool is transmitted through the cutting toolholder to the platform on which the cutting toolholder is held. This results in bulky and heavy designs and substantial cost. Examples of such prior art devices are shown in U.S. Pat. Nos. 3,158,054 and 3,026,752.

In the present invention, the cutting toolholder is of lightweight design and carries a rotating cutting tool such as a grinder or burr for cutting.

OBJECTS AND SUMMARY OF THE INVENTION

It is, therefore, a principal object of the present invention to provide a toolholder, including a platform, mounted to move a rotating cutting tool for movement in a circular path.

It is a further object of the present invention to provide a cutting toolholder which is of light weight construction and in which both the circular path in which the rotating cutting tool travels as well as the position of the cutting tool relative to the cutting toolholder is adjustable.

BRIEF DESCRIPTION OF THE DRAWINGS

Further objects and advantages of the present invention will become apparent to those skilled in the art as this specification proceeds with reference being had to the accompanying drawings in which.

DESCRIPTION OF THE PREFERRED EMBODIMENTS

Figure 1:
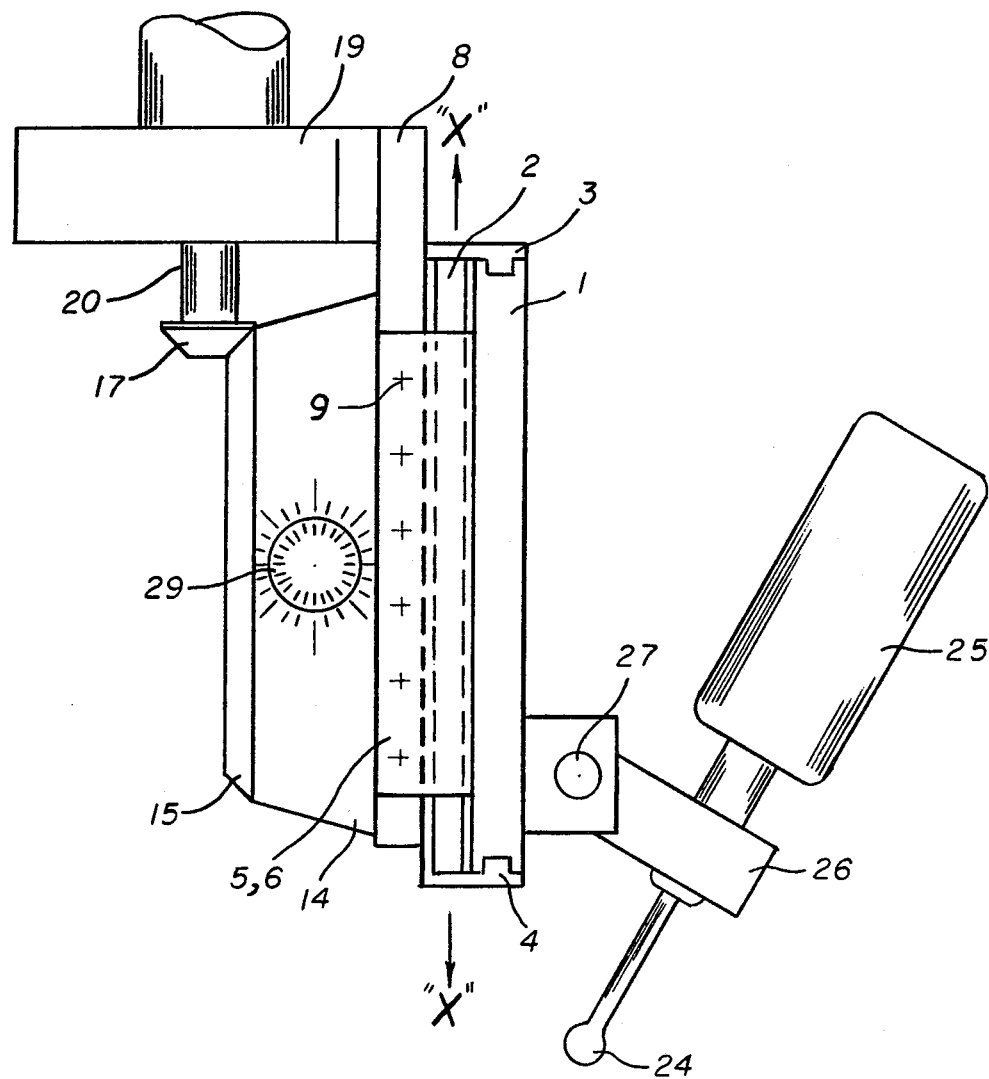
FIG. 1 is an elevational view of a toolholder embodying the invention.
Figure 2:
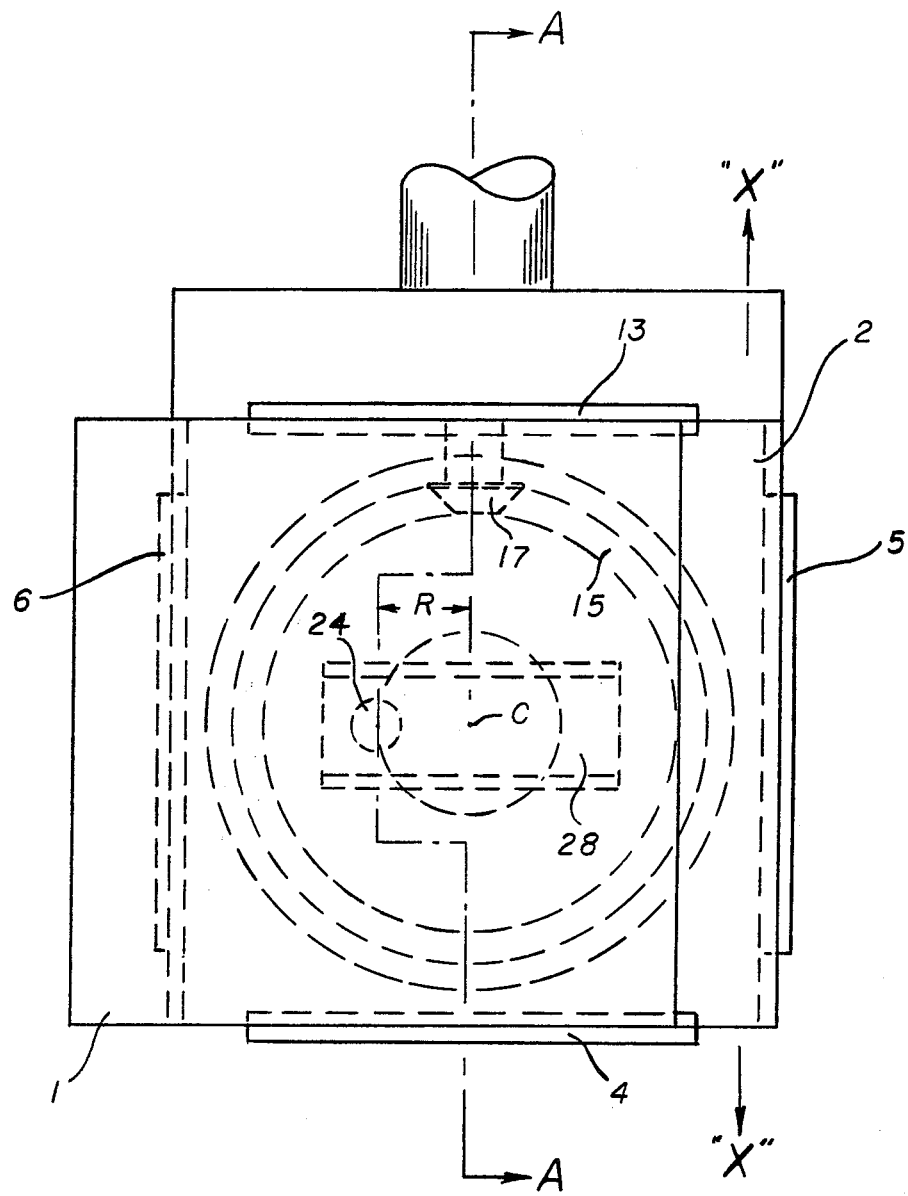
FIG. 2 is a front elevational view of the toolholder of this invention with certain parts omitted.
Figure 3:
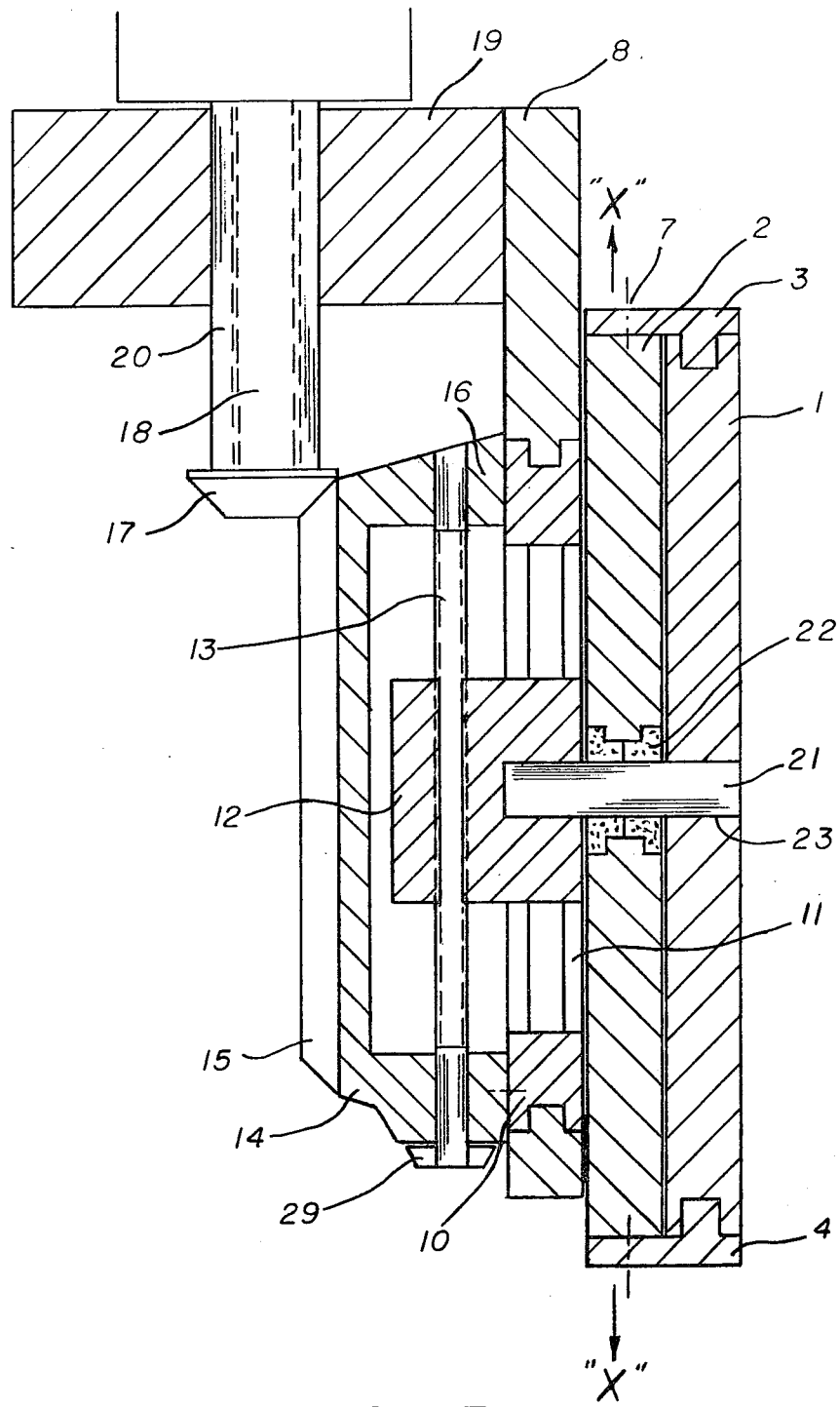
FIG. 3 is a cross-sectional view taken along the section lines A—A of FIG. 2.

As shown in the drawings, and more particularly in FIG. 1 thereof, the toolholder of the present invention comprises two movable plates 1 and 2, held in place by guide plates or ways 3, 4 and 5, 6 (FIG. 2) respectively. Guide plates 3 and 4 are fastened with appropriate fastening means 7 to plate 2, while guide plates 5, 6 are fastened to a base frame 8 by appropriate fastening means 9. Guide plates 3 and 4 restrain plate 1 from movement in any direction other than the direction Y—Y shown in FIG. 2 of the drawings, while guide plates 5, 6 restrain platform No. 2 from movement in a direction other than the direction X—X as shown in FIG. 2.

Mounted for rotation within base frame 8, is a rotating plate 10. Plate 10 has a guide way 11 which contains for slidable movement therein an adjustment block 12. The adjustment block 12 may be adjusted along the guide way 11 by means of an adjustment mechanism or screw 13. The adjustment screw 13 is mounted in a hollow housing 14 which carries a ring gear 15. The hollow housing 14 is attached with suitable fastening means 16 to the rotating plate 10. Ring gear 15 is driven for rotation by means of a pinion 17 driven by means of a power source 18.

Attached to base plate 8 is a quill collar 19 for attaching the entire assembly to a stationary portion 20 of the power source.

Press fitted or otherwise fixedly attached to the adjustment block 12 is a pin 21 which extends through way bearing 22 in plate 2 and with a rotating fit through an opening 23 in plate 1. Way bearing 22 for pin 21 slides in guide way 28 (FIG. 2) in plate 2.

As shown in FIG. 1, a rotating cutting tool 24 driven by a power source 25 is adjustably mounted to plate 1 by means of a pivotal arm 26 through pivot 27. The power tool is fixedly locked in pivotal arm 26 at a desired angle.

In operation, the entire assembly is fixedly attached to a stationary portion 20 of a vertical milling machine or other suitable device by means of quill collar 19. The assembly is adjusted upwardly to ensure a proper mesh between ring gear 15 and pinion 17.

By imparting rotary motion to pinion 17, bevel gear 15, the hollow housing 14 and the plate 10 are caused to rotate.

Plate 2 is constrained by guide plates 5, 6 and can, therefore, move only linearly in the direction X—X.

The amount of movement of the plate 2 in the direction X—X is controlled by the distance R (FIG. 2) with which the pin 21 is displaced from the center C of plate 2. The total linear movement of plate 2 is equal to 2 × R.

Plate 1 is carried by plate 2 and can only move with respect to plate 2 in a direction Y—Y (FIG. 2) which is perpendicular to the direction of movement X—X of plate 2.

The amount of movement of plate 1 with respect to plate 2 is always equal to the amount of movement of plate 2 and is similarly controlled by the distance R with which the pin 21 is displaced from the center C of plate 2.

The composite movement in directions X—X and Y—Y of plate 1 therefor comprises a perfect circle of adjustable radius R limited only by the physical size of this device.

Since the rotating cutting tool 24 is attached to plate 1, it will move in a circular path and depending on the position of the tool with respect to a workpiece it can cut a concave or convex circular surface into or onto the workpiece.

In order to adjust the radius R to increase or decrease the radius of the cutting path of the rotating cutting tool 24, the operator turns adjustment screw 13 to a desired position indicated by the graduated dial 29.

The present invention is not limited to the structure shown and hereinabove described, and it is contemplated that numerous changes or modifications can be made in the illustrated structure and it is intended to include herein not only the illustrated structure, but also all modifications thereof which come within the scope of the following claims.

What is claimed is:

1. A toolholding apparatus comprising:

a base frame, a plate member mounted for rotation in said base frame, drive means operatively connected to said plate member for rotating said member in a predetermined direction and at a predetermined speed, a first plate mounted between guide ways attached to said base frame permitting movement of said first plate in a first direction, said first plate member having an elongated slot therein, a second plate mounted between guide ways attached to said first plate permitting movement of said second plate in a second direction perpendicular to said first direction, an adjustment block mounted in said plate member for rotation therewith and adjustable with respect to the center of said plate member, a pin attached to said adjustment block and extending through said elongated slot in said first plate member and through said second plate member, whereby said second plate member traverses a circular path, and a power driven cutting tool attached to said second plate by means of a pivoted arm.

2. The apparatus of claim 1 wherein the drive means comprises a hollow housing attached to said plate member, said housing including a ring gear in meshing engagement with a drive pinion.

3. The apparatus of claim 2 further including an adjustment screw extending through said hollow housing for changing the position of said adjustment block.

* * * * *